(12) United States Patent
Inoue

(10) Patent No.: US 9,283,812 B2
(45) Date of Patent: Mar. 15, 2016

(54) PNEUMATIC RADIAL TIRE FOR HEAVY LOADS

(75) Inventor: Hirobumi Inoue, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 965 days.

(21) Appl. No.: 13/511,937

(22) PCT Filed: Nov. 25, 2010

(86) PCT No.: PCT/JP2010/006897
§ 371 (c)(1),
(2), (4) Date: Jun. 8, 2012

(87) PCT Pub. No.: WO2011/065006
PCT Pub. Date: Jun. 3, 2011

(65) Prior Publication Data
US 2012/0247638 A1    Oct. 4, 2012

(30) Foreign Application Priority Data

Nov. 25, 2009    (JP) .................... 2009-267931

(51) Int. Cl.
*B60C 13/00* (2006.01)
*B60C 3/00* (2006.01)
*B60C 15/06* (2006.01)
*B60C 11/01* (2006.01)
*B60C 3/04* (2006.01)
*B60C 9/14* (2006.01)

(52) U.S. Cl.
CPC . *B60C 11/01* (2013.01); *B60C 3/04* (2013.01); *B60C 9/14* (2013.01); *B60C 13/003* (2013.01); *B60C 15/0607* (2013.04); *B60C 2200/06* (2013.04)

(58) Field of Classification Search
None
See application file for complete search history.

(56) References Cited

U.S. PATENT DOCUMENTS 3,814,161 A    6/1974    Powell et al.
3,825,052 A *  7/1974    Matsuyama ............. B60C 3/04
                                                    152/209.13

(Continued)

FOREIGN PATENT DOCUMENTS

EP    1 026 011 A2    8/2000
FR    2.095.395       2/1972

(Continued)

OTHER PUBLICATIONS

Extended European Search Report issued in European Patent Application No. 10832855.0 dated Aug. 22, 2013.

(Continued)

*Primary Examiner* — Justin Fischer
(74) *Attorney, Agent, or Firm* — Oliff PLC

(57) ABSTRACT

A pneumatic radial tire for heavy loads that prevents occurrence of a side cut due to a projection while decelerating spread of a cut damage to a tire inner surface. In a widthwise cross section of the tire, angle α satisfies a relation 0<α≤30° that a line joining an intersection between a virtual line and a tire outer surface and a maximum tire width position forms with respect to a radial line segment, the virtual line passing through a maximum carcass width position that is parallel to a tire axis line. An angle β satisfies a relation 0≤β<30° that a line joining the maximum tire width position and a turnoff point forms with respect to the radial line segment, and a reinforcing rubber is disposed between a body portion and a turn-up portion of the carcass.

8 Claims, 6 Drawing Sheets

(56) References Cited

U.S. PATENT DOCUMENTS

| | | | |
|---|---|---|---|
| 5,569,341 A | 10/1996 | Fukushima et al. | |
| 2004/0007303 A1 | 1/2004 | Fishman | |

FOREIGN PATENT DOCUMENTS

| | | | |
|---|---|---|---|
| FR | 2483854 | * | 12/1981 |
| JP | B2-54-11563 | | 5/1979 |
| JP | 55-36139 | | 3/1980 |
| JP | A-07-144513 | | 6/1995 |
| JP | A-07-228110 | | 8/1995 |
| JP | A-2001-213114 | | 8/2001 |

OTHER PUBLICATIONS

International Search Report issued in International Application No. PCT/JP2010/006897 dated Dec. 28, 2010 (with translation).

Jun. 24, 2014 Japanese Office Action issue din Japanese Application No. 2011-543110 (with translation).

* cited by examiner (a)

(b)

(a)

(b)

PNEUMATIC RADIAL TIRE FOR HEAVY LOADS

TECHNICAL FIELD

The present invention relates to a pneumatic radial tire for heavy loads, and in particular to a pneumatic radial tire suitable for use in heavy load vehicles such as a construction vehicle and capable of preventing a side cut failure that occurs when the tire rides on a projection such as a stone on a running road.

RELATED ART

In such a tire for a construction vehicle traveling on a rock-strewn road in an underground mine or the like, as FIG. 6A schematically shows a widthwise cross section of a half of a tire in a state where the tire is rotating under load, a sidewall area is deformed to protrude largely outward in a tire width direction and therefore vulnerable to a side cut due to a contact and cutting with the projection such as a stone during rotation as illustrated in FIG. 6B, posing a high risk that the side cut reaches a carcass of the tire to cause malfunction such as puncture.

In an attempt to cope with the above problem, bias tires including a carcass ply composed of a plurality of layers of which cords intersect each other between the layers have been widely and conventionally used. The reason is that such a bias tire with the thick cord intersecting layers provides a benefit of favorable side out resistance because a side cut damage is prevented from penetrating into a tire inner surface.

On the other hand, radial tires often have only a single steel cord carcass ply disposed in a sidewall portion and therefore a smaller rubber thickness of the sidewall portion, thereby carrying a high risk where the side cut easily penetrates into the carcass to cause the puncture, although such a radial tire is more advantageous than the bias tire in terms of wear resistance, traction performance, and weight, as well as manufacturing hour and cost.

Some techniques have been proposed for preventing the side cut failure. For example, Patent Literature 1 proposes a technique for improving cut growth resistance potential of a radial tire including a steel cord carcass ply on which a reinforcing rubber material is clearly interposed, the steel cord carcass ply turned up along bead cores such that a carcass turn-up portion along each of the bead cores extending to approximately one half height H/2 of a tire height H, wherein in a range of ±0.1H with the one half height H/2 being as the center, a width h and a thickness w of the reinforcing rubber material, a width h1 of an overlapping portion of the turn-up portion of the carcass ply, and a thickness w1 of the overlapping portion satisfy the following formulae (1) $0.2w1 \leq w \leq 1.0w1$ and (2) $0.5h1 \leq h \leq 1.0h1$, and the reinforcing rubber material (3) includes 10-80 parts by weight of a high cis-1,4 polybutadiene per 100 parts by weight of rubber and (4) has a modulus of elasticity M at 300% elongation within a range of 60 kgf/cm$^2 \leq M \leq 100$ kgf/cm$^2$ and a rebound resilience coefficient R within a range of $0.4 < R < 0.7$. Nevertheless, the technique according to Patent Literature 1 is not sufficient to improve the side cut resistance of the radial tire to an equivalent level to that of the bias tire, and when the side cut occurs, the cut can still spread to the tire inner surface as shown in FIG. 6B.

Other techniques have been also proposed for reducing occurrence of the side cut per se in order to avoid a possible side cut failure. For example, Patent Literature 2 describes a technique for reducing the occurrence of the side cut by making the sidewall portion substantially perpendicular to a road surface even when the sidewall portion is deformed to protrude largely outward in a tire width direction, by gradually increasing a width of a tire outer surface from a maximum width position of the Carcass ply to a position at 0.3 to 0.7 times a radial distance between the maximum width position of the carcass ply and a tread end and also gradually decreasing the width of the tire outer surface from the aforementioned position to the tread end in a widthwise cross section of a tire when the tire is fitted on a application rim, inflated with an internal pressure, and in a no-load state.

However, according to the tire of Patent Literature 2, the side cut damage cannot be significantly reduced, because a volume of rubber to be disposed in a buttress located in an outer area of the tread ground-contact end in the tire width direction is increased, and a load bearing amount and deflection is increased in the outer area. Furthermore, since the rubber volume is increased in the buttress located in the outer area of the tread ground-contact end, a heat generation amount is increased due to the volume, which might lead to a decrease in resistance against heat generation of the tread rubber.

PATENT LITERATURE 1: JP-A-07-228110
PATENT LITERATURE 1: JP-A-2001-213114

SUMMARY OF INVENTION

In view of the above, the present invention aims to provide a pneumatic radial tire for heavy loads that is capable of efficiently preventing occurrence of the side cut due to the projection such as a stone and also capable of decelerating spread of a cut damage to a tire inner surface even when the side cut occurs.

A pneumatic radial tire for heavy loads according to the present invention comprises a tread portion, a pair of sidewall portions, a pair of bead portions each having a bead core therein, a radial carcass composed of at least one carcass ply including a body portion extending toroidally between the bead cores of the bead portions and turn-up portions turned up along the bead cores, and a tread rubber disposed on an outer circumferential side of a crown region of the carcass, wherein in a widthwise cross section of the tire when the tire is mounted to an application rim and inflated with a specified internal pressure: a turnoff point is defined at an end of an inclined area inclined both outward in a tire width direction and inward in a tire radial direction from a tread ground-contact end of the tread rubber; a maximum tire width position is positioned further outward in the tire width direction than a tire outer surface corresponding to a maximum carcass width position and the turnoff point and is also positioned further outward in the tire radial direction than the maximum carcass width position and further inward in the tire radial direction than the turnoff point; an angle $\alpha$ is defined as an acute angle that a line joining an intersection between a virtual line and the tire outer surface and the maximum tire width position forms with respect to a radial line segment, the virtual line passing through the maximum carcass width position in a direction parallel to a tire axis line, and the angle $\alpha$ satisfying a relationship $0 < \alpha \leq 30°$; a distance h is defined as a distance in the tire radial direction from a tread center to the maximum tire width position, the distance h ranging from 0.20SH to 0.40SH where SH is a tire section height, and an angle $\beta$ is defined as an acute angle that a line joining the maximum tire width position and the turnoff point forms with respect to the radial line segment, the angle $\beta$ satisfying a relationship $0 \leq \beta < 30°$; and a reinforcing rubber is disposed between the body portion and the turn-up portion of the carcass over a distance of 0.15SH to 0.25SH outward in the tire radial direction from the maximum carcass width position and over a distance of 0.20SH to 0.30SH inward in the tire radial direction from the maximum carcass width position, the reinforcing rubber having a modulus of elasticity M at 300% elongation ranging from 60 to 100 kgf/cm$^2$ and a rebound resilience coefficient R in a range 0.4<R<0.7.

Note that the phrase "application rim" as used herein refers to any of rims specified in industrial standards valid in respective regions where tires are manufactured and used. Examples of such industrial standards include JATMA (Japan Automobile Tire Manufacturers Association) YEAR BOOK in Japan, ETRTO (European Tyre and Rim Technical Organisation) STANDARDS MANUAL in Europe, and TRA (THE TIRE and RIM ASSOCIATION INC.) in the United States. The phrase "specified internal pressure" refers to a maximum air pressure specified in JATMA or the like. The phrase "maximum carcass width position" refers to a position corresponding to the maximum width, of the toroidally extending carcass in a widthwise cross section of the tire when the tire is mounted to the application rim specified by JATMA or the like and inflated with the maximum air pressure specified by the JATMA standard according to a tire size, and denotes a direct distance between outermost carcass plies when the carcass comprises a plurality of carcass plies. The phrase "maximum tire width position" refers to a position corresponding to the maximum width in the widthwise cross section of the tire when the tire is mounted to the application rim specified by JATMA or the like and inflated with the maximum air pressure specified by the JATMA standard according to the tire size. The section height SH of the tire refers to a length corresponding to ½ of a difference between an outer diameter of the tire and a rim diameter when the tire is mounted to the application rim, inflated with the specified air pressure, and in the no-load state.

The phrase "modulus of elasticity M at 300% elongation" refers to a tensile stress (M300) at 300% elongation when a ring-shaped rubber test piece is prepared, and the rubber test piece is subjected to an elongation test at a temperature of 60° C. according to JIS K6251. The phrase "rebound resilience coefficient R" refers to a value obtained by preparing a rubber test piece and pressing a needle of a predetermined shape against a surface of the test piece via a spring to measure a depth of the needle from the surface according to JIS K6253.

In the aforementioned tire, it is more preferable that a distance m1 is defined as a distance of the inclined area of the tread rubber in the tire width direction, the distance m1 ranging from 0.08SH to 0.10SH, and that a distance m2 is defined as a distance in the tire radial direction from the tread center to the inclined area, the distance m2 ranging from 0.08SH to 0.10SH.

It is also preferable that, when the tire is mounted to the application rim, inflated with the specified internal pressure, and applied with a load corresponding to a specified mass, an angle $\gamma$ is defined as an acute angle that the line joining the intersection between the virtual line and the tire outer surface and the maximum tire width position forms with respect to the virtual line, the virtual line passing through the maximum carcass width position in the direction parallel to the tire axis line, and the angle $\gamma$ satisfying a relationship 70°≤$\gamma$≤90°.

Furthermore, it is preferable that a radially outermost end of the reinforcing rubber is positioned further inward in the tire radial direction than the maximum tire width position.

In a pneumatic radial tire for heavy loads according to the present invention, particularly in a widthwise cross section of the tire when the tire is mounted to an application rim and inflated with a specified internal pressure: a turnoff point is defined at an end of an inclined area inclined both outward in a tire width direction and inward in a tire radial direction from a tread ground-contact end of the tread rubber; a maximum tire width position is positioned further outward in the tire width direction than a tire outer surface corresponding to a maximum carcass width position and the turnoff point and is also positioned further outward in the tire radial direction than the maximum carcass width position and further inward in the tire radial direction than the turnoff point; an angle $\alpha$ is defined as an acute angle that a line joining an intersection between a virtual line and the tire outer surface and the maximum tire width position forms with respect to a radial line segment, the virtual line passing through the maximum carcass width position in a direction parallel to a tire axis line, and the angle $\alpha$ satisfying a relationship 0<$\alpha$≤30°; and a distance h is defined as a distance in the tire radial direction from a tread center to the maximum tire width position, the distance h ranging from 0.20SH to 0.40SH wherein SH is a tire section height, and an angle $\beta$ is defined as an acute angle that a line joining the maximum tire width position and the turnoff point forms with respect to the radial line segment, the angle $\beta$ satisfying a relationship 0≤$\beta$<30°. With the above structures, when the tire is applied with a load corresponding to a specified mass, as FIG. 1A schematically shows a widthwise Cross section of a half of the tire during rotation under load, a line joining a maximum tire width position in a no-load state and the intersection between the virtual line and the tire outer surface is inclined inward with respect to a road surface in the tire width direction, the virtual line passing through the maximum carcass width position in a direction parallel to a rim diameter line. As a result, even when a sidewall area protrudes outward in the tire width direction, the sidewall area is prevented from becoming wider than a buttress, and accordingly, occurrence of a side cut is prevented in the sidewall area even when the tire rides on the projection such as a stone, and an amount of rubber to be disposed in the buttress is also reduced. Consequently, the tire according to the present invention provides high level of compatibility between the side cut resistance, a reduction in load on the buttress, and the resistance against heat generation.

More specifically, if the angle $\alpha$ is greater than 30°, the amount of rubber to be used in the buttress is increased, and a heat generation amount in the buttress area is increased. As a result, the resistance against heat generation in the area might be degraded.

If the distance h is less than 0.20SH, the amount of rubber to be disposed in the buttress is increased and a rubber volume is increased, which leads to an increase in heat generation amount. On the other hand, if the distance h is greater than 0.40SH, the side cut resistance might not be improved in an area vulnerable to the side cut, especially in an area located radially inward from the buttress.

If the angle $\beta$ is 30° or more, the side cut resistance might not be improved.

Furthermore, a reinforcing rubber is disposed between the body portion and the turn-up portion of the carcass over a distance of 0.15SH to 0.25SH outward in the tire radial direction from the maximum carcass width position and over a distance of 0.20SH to 0.30SH inward in the tire radial direction from the maximum carcass width position, the reinforcing rubber having a modulus of elasticity M at 300% elongation ranging from 60 to 100 kgf/cm$^2$ and a rebound resilience coefficient R in a range 0.4<R<0.7. With the above structure, the area of the tire that is vulnerable to the side cut is disposed with the reinforcing rubber, and owing to the reinforcing rubber, even when the side cut occurs, as FIG. 1B schematically shows a widthwise cross section of the half of the tire during the rotation under load, concentration of the tensile stress on the turn-up portion of the carcass caused by a tension generated in a tire circumferential direction during the rotation, as well as shearing deformation between the body portion and the turn-up portion of the carcass, is relieved. Consequently, progress of a cut damage to a tire inner surface is prevented.

More particularly, if the reinforcing rubber is disposed over a distance of less than 0.15SH outward in the tire radial direction from the maximum carcass width position, the reinforcing rubber might not protect the area where the cut damage and the spread of the damage may occur. As a result, the spread of the cut damage might not be decelerated. On the other hand, if the reinforcing rubber is disposed over a distance of greater than 0.25SH, this means that the stiff reinforcing rubber is disposed on an area of the tire that is largely deformed. In this circumstance, the reinforcing rubber might bring about a failure such as separation.

More particularly, if the reinforcing rubber is disposed over a distance of less than 0.20SH outward in the tire radial direction from the maximum carcass width position, the reinforcing rubber might not protect the area where the cut damage and the spread of the damage may occur. As a result, the spread of the cut damage might not be decelerated. On the other hand, if the reinforcing rubber is disposed over a distance of greater than 0.30SH, the stiff reinforcing rubber is inevitably disposed on an area of the tire that is largely deformed. In this case, the reinforcing rubber might bring about a failure such as separation.

If the modulus of elasticity M at 300% elongation is less than 60 kgf/cm$^2$, rigidity of the sidewall portion is decreased. On the other hand, if the modulus of elasticity M at 300% elongation is greater than 100 kgf/cm$^2$, it becomes difficult to prevent spread growth of the cut damage to the tire inner surface, and rigidity of the sidewall portion might be excessively increased.

If the rebound resilience coefficient R is 0.4 or less, rigidity of the sidewall portion is decreased. On the other hand, if the rebound resilience coefficient R is 0.7 or more, it might be impossible to maintain crack growth resistance of a rubber composition constituting the reinforcing rubber.

Thus, with the aforementioned structures, the tire according to the present invention provides a tire shape that is capable of reducing the occurrence of the side cut and also decelerates the spread of the side cut to the tire inner surface.

DESCRIPTION OF EMBODIMENTS

Figure 2:
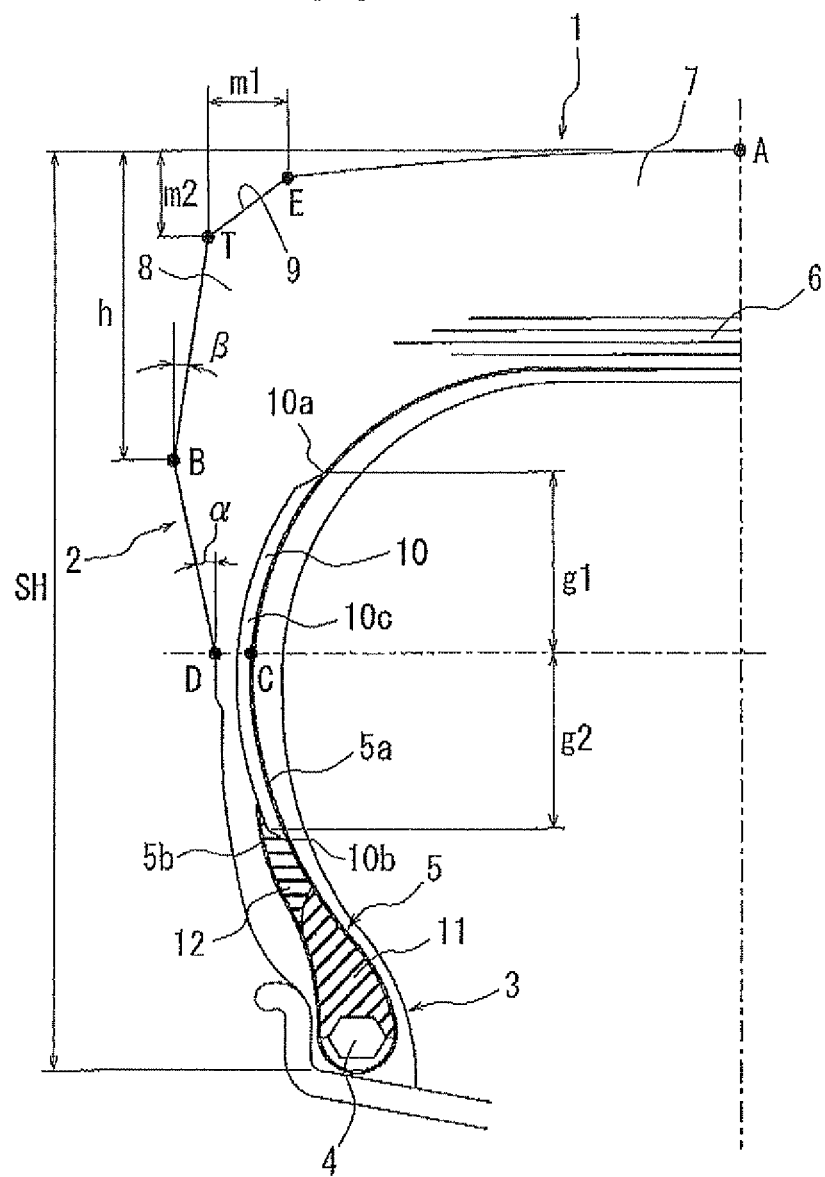
FIG. 2 is a widthwise cross section of a half of a radial tire for heavy loads according to an embodiment when the tire is mounted to the application rim, inflated with the specified air pressure, and in a no-load state.

The following describes a radial tire for heavy loads according to the present invention in detail with reference to the drawings. In FIG. 2 showing an embodiment of the radial tire for heavy loads, a reference numeral 1 refers to a tread portion, a reference numeral 2 refers to a pair of sidewall portions continuous with either side of the tread portion 1 and extending radially inward, a reference numeral 3 refers bead portions each continuous with one of the pair of sidewall portions and extending radially inward.

The radial tire for heavy loads shown in FIG. 2 comprises a pair of bead portions 3 each having a hexagonal bead core 4 embedded therein, and a radial carcass 5 composed of a single carcass ply including a body portion 5a extending toroidally between the bead cores 4 and turn-up portions 5b each turned up along one of the pair of bead cores 4 from an inner side to an outer side in the tire width direction. Note that the carcass ply may be formed by a steel cord, an organic fiber cord, or the like extending orthogonal to a tire circumferential direction, for example. Each turn-up portion 5b of the carcass extends to a point corresponding to 0.30 to 0.46% of a section height SH of the tire as measured from a rim diameter line.

A belt 6 consisting of four belt layers in which cords are intersected with each other between the layers and a tread rubber 7 are sequentially arranged on an outer circumferential side of a crown region of the carcass 5, and an area extending radially inward from a tread ground contact end E over a distance of 20 to 40% of a tread ground-contact width forms a buttress 8. Although not shown, a surface of the tread rubber 7 is provided with a plurality of lateral grooves or the like extending along a tread width direction. Note that the phrase "tread ground-contact width" refers to a maximum direct distance in a tire axis direction, providing that the tire is mounted to the application rim, inflated with the specified air pressure, disposed on a flat board vertically at a standstill, and applied with the load corresponding to the specified mass.

In the sidewall portion 2 and the bead portion 3, an outer side in the tire width direction of the carcass 5 is coveted by a side rubber disposed along an outer surface of the carcass 5.

In the above radial tire for heavy loads: a turnoff point T is defined at an end of an inclined area 9 of the tread rubber 7, the inclined area 9 inclined both inward in the radial direction and outward in the tire width direction from the tread ground-contact end E; a maximum tire width position B is positioned further outward in the tire width direction than an intersection D on the tire outer surface corresponding to a maximum carcass width position C and the turnoff point T and is also positioned further outward in the radial direction than the maximum carcass width position C and further inward in the radial direction than the turnoff point T; an angle α is defined as an acute angle that a line joining the intersection D between a virtual line and the tire outer surface and the maximum tire width position B forms with respect to a radial line segment, the virtual line passing through the maximum carcass width position C in a direction parallel to a tire axis line, and the angle α satisfying a relation $0<\alpha\leq30°$, preferably $4°\leq\alpha\leq14°$; a distance h is defined as a distance in the radial direction from a tread center A to the maximum tire width position B, the distance h ranging from 0.20SH to 0.40SH where SH is the section height of the tire; and an angle β is defined as an acute angle that a line joining the maximum tire width position B and the turnoff point T forms with respect to the radial line segment, the angle β satisfying a relation $0\leq\beta<30°$, preferably $7°\leq\beta\leq17°$.

Furthermore, a reinforcing rubber 10 is disposed, between the body portion 5a and the turn-up portion 5b of the carcass continuously over a distance g1 of 0.15SH to 0.25SH outward in the tire radial direction from the maximum carcass width position C and a distance g2 of 0.20SH to 0.30SH inward in the tire radial direction from the maximum carcass width position C, the reinforcing rubber 10 having a modulus of elasticity M at 300% elongation ranging from 60 to 100 kgf/cm² and a rebound resilience coefficient R in a range $0.4<R<0.7$.

The reinforcing rubber 10 has a radially outermost end 10a located further inward in the radial direction than the maximum tire width position B and a radially innermost end 10b located further inward in the radial direction than the turn-up portion 5b of the carcass.

A thickness of the reinforcing rubber 10 is made substantially constant in a central area 10c located between the radially outermost end 10a and the radially innermost end 10b, and gradually decreased toward both the ends 10a, 10b. An average thickness in the central area 10c is preferably 15±5 mm in order to prevent the progress of cracks.

Between the body portion 5a and the turn-up portion 5b of the carcass in each bead portion 3, a hard bead filler 11 having a substantially triangle cross section gradually tapering outward in the radial direction from the corresponding bead core 4 and made of a hard rubber may be disposed, and a soft bead filler 12 having a trapezoid cross section with its short side laid along the carcass body portion and made of a rubber softer than the hard bead filler 11 may also be disposed further outward in the radial direction from the hard bead filler 11. The hard bead filler 11 is disposed along the body portion 5a of the carcass, and the soft bead filler 12 is disposed between the hard bead filler 11 and the reinforcing rubber 10 along the body portion 5a and the turn-up portion 5b of the carcass. In the above circumstance, sides forming the hard bead filler 11 and the soft bead filler 12 may be straight, curved, and polygonal lines.

Disposing the hard bead filler 11 along the body portion 5a of the carcass reduces occurrence of the tire failure by decreasing strains caused when the tire stumbles.

In the above pneumatic tire, a distance m1 is defined as a distance in the tire width direction of the inclined area 9 inclined both outward in the tire width direction and inward in the radial direction from the tread ground-contact end B of the tread rubber 7, the distance m1 preferably satisfying a relationship $0.08SH\leq m1\leq0.10SH$, and a distance m2 is defined as a distance in the radial direction of the inclined area 9, the distance m2 preferably satisfying a relationship $0.08SH\leq m2\leq0.10SH$.

With the above structure, rubber corners of the buttress 8, which is less likely to receive the side cut compared with the sidewall portion 2, are chamfered. As a result, the tire provides compatibility between the side cut resistance and the resistance against heat generation.

The reinforcing rubber 10 is more likely to generate heat and is larger in rubber thickness compared with the rubber materials located at a periphery of the reinforcing rubber 10. Furthermore, an end of the belt 6 tends to generate heat. However, by positioning the radially outermost end 10a of the reinforcing rubber 10 further inward in the radial direction than the maximum tire width position B, the radially outermost end 10a of the reinforcing rubber. 10 is positioned at a distance from the above areas, whereby failure due to the heat generation is prevented.

Preferably, the reinforcing rubber 10 is disposed along the body portion 5a of the carcass. By doing so, the spread of the side cut to the carcass body portion 5a is restrained even when the side cut occurs, so that the failure at an early stage is prevented.

Preferably, the reinforcing rubber 10 is made of a rubber softer than that of the hard bead filler 11 and harder than that of the soft bead filler 12.

Figure 3:
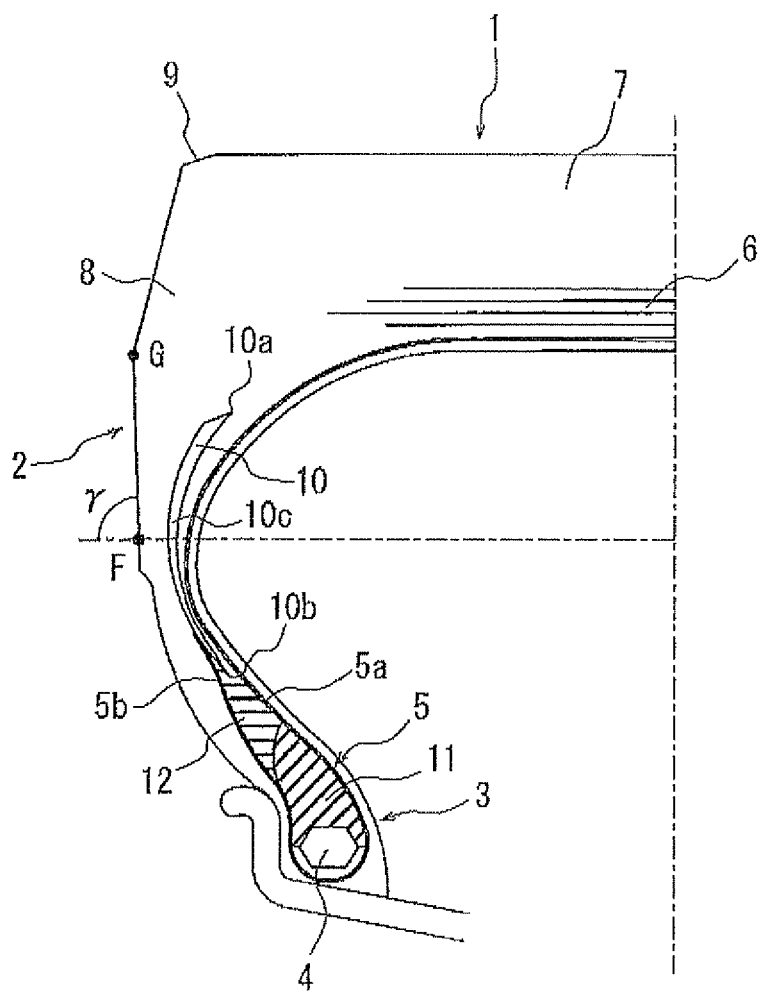
FIG. 3 is a widthwise cross section of the half of the tire shown in FIG. 2 when the tire is applied with the load corresponding to the specified mass.

In FIG. 3 showing a widthwise cross section of the half of the above-described tire when the tire is applied with the load corresponding to the specified mass, in the cross section along the tire width direction when the tire is inflated with the specific internal pressure and in the no-load state, an angle γ is defined as an acute angle that the line joining an intersection F between the virtual line and the tire outer surface and the maximum tire width position G forms with respect to the virtual line, the virtual line passing through the maximum width position of carcass 5 in the direction parallel to the rim diameter line, and the angle γ preferably satisfying a relationship $70°\leq\gamma 90°$.

Figure 1:
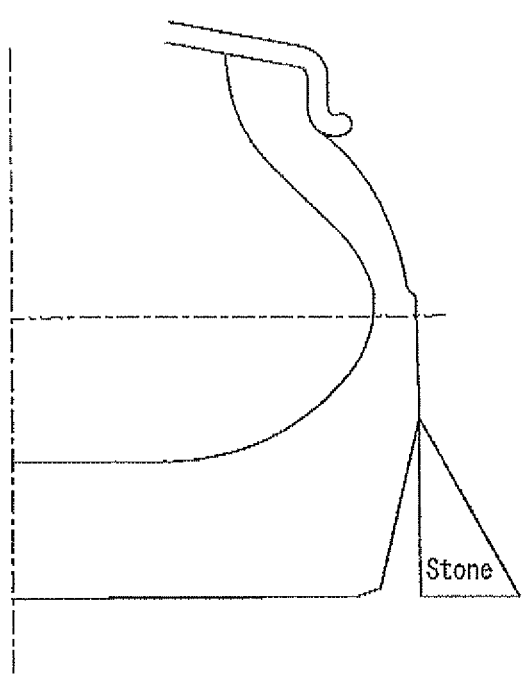
FIG. 1A schematically shows a widthwise cross section of a half of a radial tire for heavy loads according to an embodiment during rotation under load when the tire is mounted to an application rim, inflated with a specified air pressure, and applied with a load corresponding to a specified mass.
FIG. 1B schematically shows a state in which a side cut occurs in the tire of FIG. 1A.
Figure 1:
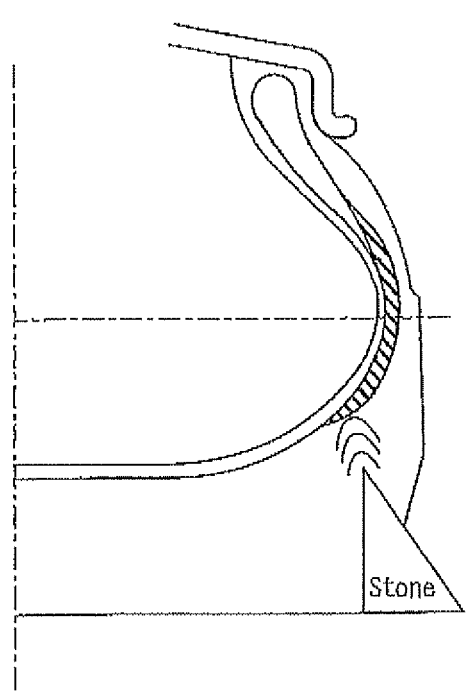

With the above structure, even when the tire rides on the projection such as a stone, the side rubber is prevented from being deflected outward in the tire width direction as shown in FIG. 1A, resulting in less chance of the side cut. Consequently, the side cut resistance of the tire is improved.

More particularly, when the angle γ is less than 70°, a tire section width is increased, and the tire sticks out of the vehicle and exposed to the risks of the side cut. On the other hand, when the angle γ is greater than 90°, the side rubber bulges outward in the tire width direction, possibly hampering the side cut prevention efforts.

It is also preferable that the reinforcing rubber 10 includes a high cis-1,4 polybutadiene, because with this composition, crack growth resistance is secured, and deterioration of the rubber composition is prevented.

Figure 4:
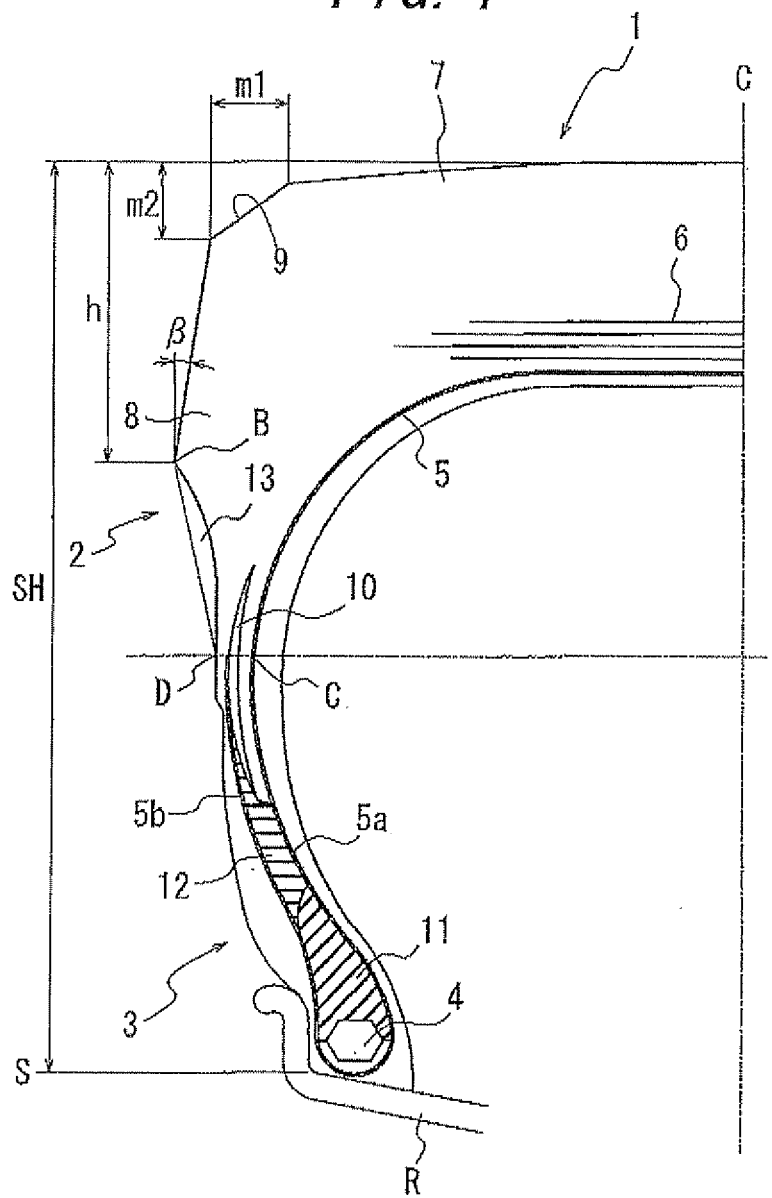
FIG. 4 is a widthwise cross section of a half of a radial tire for heavy loads according to another embodiment when the tire is mounted to the application rim, inflated with the specified air pressure, and in the no-load state.
Figure 5:
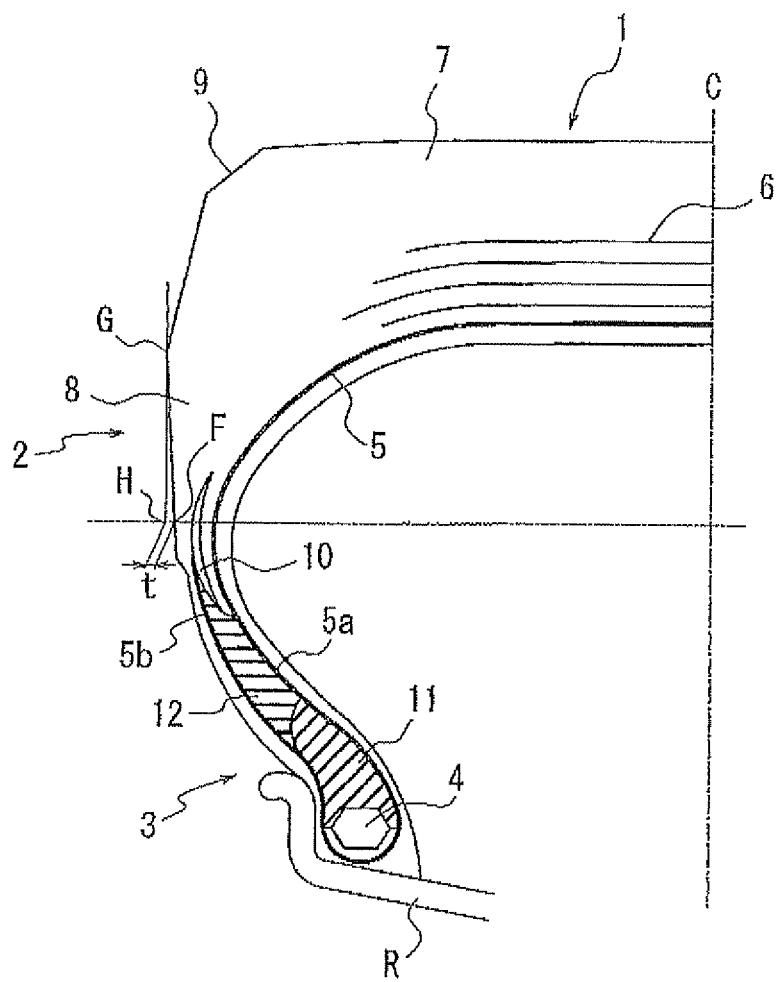
FIG. 5 is a widthwise cross section of the half of the tire shown in FIG. 4 when the tire is applied with the load corresponding to the specified mass.
Figure 6:
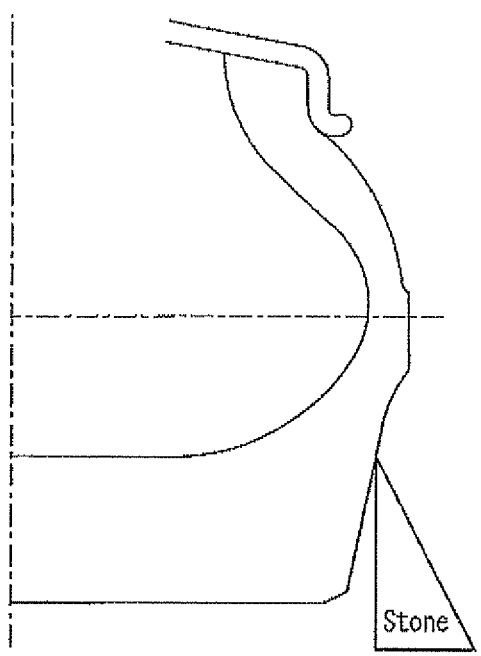
FIG. 6A schematically shows a cross section of a half of a conventional tire during rotation under load when the tire is mounted to the application rim, inflated with the specified air pressure, and applied with the load corresponding to the specified mass.
FIG. 6B schematically shows a state when a side cut occurs in the tire of FIG. 6A.
Figure 6:
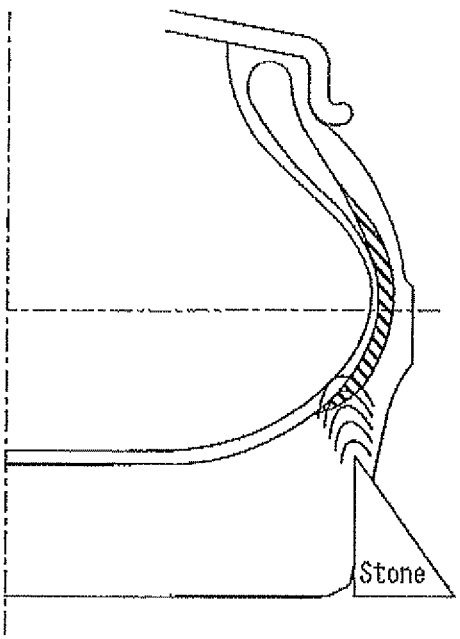

FIG. 4 is a widthwise cross section of a half of a radial tire for heavy loads according to another embodiment when the tire is mounted to the application rim, inflated with the specified air pressure, and in the no-load state. FIG. 5 is a widthwise cross section of the half of the tire shown in FIG. 4 when the tire is applied with the load corresponding to the specified mass. It should be noted that the same reference numerals are given to the same components as in the aforementioned figures, and a description of such components is not repeated.

In the present embodiment, a recessed area 13 is formed in the sidewall portion 2 between the maximum tire width position B and the intersection D between the virtual line and the tire outer surface, the virtual line passing through the maximum carcass width position C in a direction parallel to a rim diameter line S, and the recessed area 13 having a curvature radius preferably in a range from SH to 0.5SH.

According to the above structure, even when the sidewall portion 2 is overloaded, as shown in FIG. 5, the sidewall portion 2 is prevented from being deformed to protrude outward in the tire width direction, and a line joining the maximum tire width position G and the intersection F between the virtual line and the tire outer surface is made substantially parallel to the radial line segment in the widthwise cross Section of the tire, the virtual line passing through the maximum carcass width position in the direction parallel to the rim diameter line S. As a result, the risks of occurrence of the side cut are efficiently reduced. The condition "substantially parallel to the radial line segment in the widthwise cross section of the tire" as used herein applies when, supposing that an intersection H is defined as an intersection between a virtual line passing through the maximum tire width position G in the direction parallel to the tire axis line and the line passing through the intersection F in the direction parallel to the rim diameter line S, a distance t between the intersection F and the intersection H is 10 mm or less.

EXAMPLES

Next, a test tire having a structure as shown in FIGS. 2 and 3 and a size of 26.5R25VSMS was prepared, and Example tires and Comparative Example tires 1 to 3 were obtained by modifying specifications of the test tire as shown in Table 1. With respect to each of the obtained tires, the side cut resistance was measured. Table 2 shows results of the evaluation. All the structures of Comparative Example tires other than the tread portion and the sidewall portion are the same as those of Example tires because such structures do not need any modifications.

REFERENCE SIGNS LIST 1 tread portion
2 sidewall portion
3 bead portion
4 bead Core
5 radial carcass
5a body portion
5b turn-up portion
6 belt
7 tread rubber
8 buttress
9 inclined area
10 reinforcing rubber
10a radially outermost end
10b radially innermost end
10c central area
11 hard bead filler
12 soft bead filler
13 recess

The invention claimed is:
1. A pneumatic radial tire for heavy loads comprising a tread portion, a pair of sidewall portions, a pair of bead portions each having a bead core therein, a radial carcass

TABLE 1

|  | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|
| α (°) | 20 | 7 | 17 | 17 | 7 | 20 | 20 | 20 | 0 | 20 | 0 |
| β (°) | 9 | 4 | 14 | 14 | 4 | 9 | 9 | 9 | 8 | 9 | 8 |
| γ (°) | 85 | 83 | 73 | 73 | 83 | 85 | 85 | 85 | 0 | 85 | 0 |
| h | 0.33SH | 0.33SH | 0.33SH | 0.2SH | 0.4SH | 0.33SH | 0.33SH | 0.33SH | 0.3SH | 0.33SH | 0.3SH |
| Reinforcing rubber | Present | Present | Present | Present | Present | Present | Present | Present | Not present | Not present | Present |
| g1 | 0.2SH | 0.2SH | 0.2SH | 0.2SH | 0.2SH | 0.15SH | 0.25SH | 0.25SH | — | — | 0.2SH |
| g2 | 0.3SH | 0.3SH | 0.3SH | 0.3SH | 0.3SH | 0.3SH | 0.3SH | 0.2SH | — | — | 0.3SH |
| m1 | 48 mm | 48 mm | 48 mm | 48 mm | 48 mm | 48 mm | 48 mm | 48 mm | 0 | 48 mm | 48 mm |
| m1 | 48 mm | 48 mm | 48 mm | 48 mm | 48 mm | 48 mm | 48 mm | 48 mm | 0 | 48 mm | 48 mm |
| Average thickness of central area (mm) | 15 mm | 15 mm | 15 mm | 15 mm | 15 mm | 15 mm | 15 mm | 15 mm | — | — | 15 mm |

(Side Cut Resistance)

Each of Example tires and Comparative Example tires 1 to 3 was mounted to a rim of 22.00/3.0 and inflated at an internal pressure of 650 kPa, and applied with an additional mass of 18500 kg, and 50 tires of each were brought into the market for test driving. One year later, with respect to each of Example tires and Comparative Example, the tires were sampled and evaluated based on the number of side cut failures per 50 tires. Table 2 shows results of the evaluation. Note that indices in the Table 2 are obtained by setting Comparative Example tire 1 as a control, and that the smaller index indicates the better side cut resistance.

composed of at least one carcass ply including a body portion extending toroidally between the bead cores of the bead portions and turn-up portions turned up along the bead cores, and a tread rubber disposed on an outer circumferential side of a crown region of the carcass, wherein:
    in a widthwise cross section of the tire when the tire is mounted to an application rim and inflated with a specified internal pressure, turnoff point is defined at an end of an inclined area inclined both outward in a tire width direction and inward in a tire radial direction from a tread ground-contact end of the tread rubber;

TABLE 2

|  | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|
| Cut failure rate | 20 | 18 | 15 | 15 | 20 | 25 | 16 | 19 | 100 | 80 | 80 |

From the above results, it was acknowledged that the side cut resistance was significantly improved in Example tires compared with Comparative Example tires 1 to 3.

a maximum tire width position is positioned further outward in the tire width direction than a tire outer surface corresponding to a maximum carcass width position and the turnoff point, and is also positioned further outward in the tire radial direction than the maximum carcass width position, further inward in the tire radial direction than the turnoff point;

an angle α is defined as an acute angle that a line joining an intersection between a virtual line and the tire outer surface and the maximum tire width position forms with respect to a radial line segment, the virtual line passing through the maximum carcass width position in a direction parallel to a tire axis line, and the angle α satisfying a relationship $0<\alpha\leq30°$;

a distance h is defined as a distance in the tire radial direction from a tread center to the maximum tire width position, the distance h ranging from 0.20SH to 0.40SH where SH is a tire section height, and an angle β is defined as an acute angle that a line joining the maximum tire width position and the turnoff point forms with respect to the radial line segment, the angle β satisfying a relationship $0<\beta<30°$; and a reinforcing rubber is disposed such that at least a portion of the reinforcing rubber is positioned axially between the body portion and the turn-up portion of the carcass, and said reinforcing rubber has an upper end located at a height equal to 0.15SH to 0.25SH, as measured outward from the virtual line that intersects with the maximum carcass width portion, and a lower end at a height equal to 0.20SH to 0.30SH, as measured inward from said virtual line, the reinforcing rubber having a modulus of elasticity M at 300% elongation ranging from 60 to 100 kgf/cm$^2$ and a rebound resilience coefficient R in a range $0.4<R<0.7$.

2. The pneumatic radial tire for heavy loads according to claim 1, wherein a distance m1 is defined as a distance of the inclined area of the tread rubber in the tire width direction, the distance m1 ranging from 0.08SH to 0.10SH, and a distance m2 is defined as a distance in the tire radial direction from the tread center to the turnoff point of the inclined area, the distance m2 ranging from 0.08SH to 0.10SH.

3. The pneumatic radial tire for heavy loads according to claim 1, wherein when the tire is mounted to the application rim, inflated with the specified internal pressure, and applied with a load corresponding to a specified mass, an angle γ is defined as an acute angle that the line joining the intersection between the virtual line and the tire outer surface and the maximum tire width position forms with respect to the virtual line, the virtual line passing through the maximum carcass width position in the direction parallel to the tire axis line, and the angle γ satisfying a relationship $70°\leq\gamma<90°$.

4. The pneumatic radial tire for heavy loads according to claim 1, wherein a radially outermost end of the reinforcing rubber is positioned further inward in the tire radial direction than the maximum tire width position.

5. The pneumatic radial tire for heavy loads according to claim 2, wherein when the tire is mounted to the application rim, inflated with the specified internal pressure, and applied with a load corresponding to a specified mass, an angle γ is defined as an acute angle that the line joining the intersection between the virtual line and the tire outer surface and the maximum tire width position forms with respect to the virtual line, the virtual line passing through the maximum carcass width position in the direction parallel to the tire axis line, and the angle γ satisfying a relationship $70°\leq\gamma<90°$.

6. The pneumatic radial tire for heavy loads according to claim 2, wherein a radially outermost end of the reinforcing rubber is positioned further inward in the tire radial direction than the maximum tire width position.

7. The pneumatic radial tire for heavy loads according to claim 3, wherein a radially outermost end of the reinforcing rubber is positioned further inward in the tire radial direction than the maximum tire width position.

8. The pneumatic radial tire for heavy loads according to claim 5, wherein a radially outermost end of the reinforcing rubber is positioned further inward in the tire radial direction than the maximum tire width position.

* * * * *